UNITED STATES PATENT OFFICE.

SAMUEL S. ALLEN, OF RICHMOND, INDIANA, ASSIGNOR TO HIMSELF AND JOHN B. MORRIS, OF SAME PLACE.

IMPROVED OIL BLACKING FOR LEATHER.

Specification forming part of Letters Patent No. 83,817, dated November 10, 1868.

*To all whom it may concern:*

Be it known that I, SAMUEL S. ALLEN, of the city of Richmond and State of Indiana, have invented a new and useful Oil Blacking for Leather, of which the following is a description:

My invention relates to a water-proof and preservative composition to be applied to harness, &c.; and consists of the following ingredients: Neat's-foot oil, four (4) parts; tar, two (2) parts; ivory-black, one (1) part; linseed-oil, one (1) part; tallow, one (1) part; lamp-black, three thirty-seconds ($\frac{3}{32}$) of one part; and Venice turpentine, one-sixteenth ($\frac{1}{16}$) of one part.

The best method of preparing the compound is as follows: The neat's-foot oil is boiled, by which any water that may be in it is evaporated. The lamp-black and ivory-black are then added and mixed, after which the tar, tallow, and linseed-oil are added, and when the latter are dissolved and mixed the Venice turpentine is added, and the boiling continued until the composition is entirely freed from water.

Having thus fully described my said invention, what I claim, and desire to secure by Letters Patent, is—

The within-specified composition, as an oil blacking for leather, mixed in the proportions substantially as set forth.

SAMUEL S. ALLEN.

Witnesses:
JOHN S. LYLE,
JOSEPH RIDGE.